United States Patent [19]
Vincent

[11] 3,900,416
[45] Aug. 19, 1975

[54] ELECTRICAL DEVICES CONTAINING NITROARYLSILOXANE DIELECTRIC FLUID
[75] Inventor: Gary A. Vincent, Midland, Mich.
[73] Assignee: Dow Corning Corporation, Midland, Mich.
[22] Filed: Dec. 20, 1973
[21] Appl. No.: 426,975

[52] U.S. Cl. ............... 252/63.7; 317/258; 252/64; 174/110 S; 200/150 A; 252/77
[51] Int. Cl.² ..................... H01B 3/18; H01G 4/02
[58] Field of Search ...... 282/63.7, 64; 260/448.2 N; 317/258

[56]  References Cited
UNITED STATES PATENTS
3,479,320  11/1969  Bostick ............................. 252/63.7

Primary Examiner—John D. Welsh
Attorney, Agent, or Firm—Jack E. Moermond

[57]  ABSTRACT

Improved electrical devices such as transformers and capacitors containing nitroarylsiloxanes as dielectric fluids are disclosed.

16 Claims, No Drawings

ELECTRICAL DEVICES CONTAINING NITROARYLSILOXANE DIELECTRIC FLUID

In numerous electrical devices it is necessary to provide a liquid insulating medium which is called a "dielectric fluid." This liquid has a substantially higher breakdown strength than air and by displacing air from spaces between conductors in the electrical equipment or apparatus, materially raises the breakdown voltage of the electrical device.

Various liquids including some siloxanes have been suggested for use as dielectric fluids. See, for example, U.S. Pat. No. 2,377,689 and British Pat. Nos. 899,658 and 899,661. Commonly used dielectric fluids at the present time are the polychlorinated biphenyl compounds (generally known as "PCB's"). The PCB's have lost favor in the sight of the environmentalists and be they right or wrong, efforts are being made to find suitable replacements for the PCB's. Also, with the recent advances in the field of electrical devices the standards applicable to dielectric fluids have become more severe thus spuring the search for improved materials.

While the ideal characteristics of a modern day dielectric fluid will obviously vary with the specific application, generally speaking, the following properties would be considered desirable. The dielectric fluid should have a controlled dielectric constant which does not vary with varying frequency. The fluid should have a high dielectric strength preferably greater than 300 volts/mil. It should have a high volume resistivity preferably greater than $10^{10}$ ohms, and it should have a low dissipation factor preferably less than 0.005.

It has been found, quite unexpectedly, that improved dielectric devices such as transformers and capacitors can be produced by employing nitroarylsiloxanes as dielectric fluids therein.

More specifically, this invention relates to an electrical device containing a dielectric fluid, the improvement comprising employing as the dielectric fluid a siloxane which consists essentially of from 1 to 100 mole percent of $R_xR'_ySiO_{[4-(x+y)/2]}$ siloxane units wherein $x$ has an average value of from 1 to 3, $y$ has an average value of from 0 to 2, the sum of $x + y$ being from 1 to 3, R is a nitroaryl radical containing from 6 to 18 carbon atoms, and R' is any alkyl, aryl, alkaryl or aralkyl radical containing from 1 to 18 carbon atoms, and from 0 to 99 mole percent $R''_zSiO_{(4-z)/2}$ siloxane units wherein $x$ has an average value from 0 to 3 and R" is an alkyl radical containing from 1 to 18 carbon atoms.

As indicated above the dielectric fluid can contain anywhere from 1 to 100 mole percent of siloxane units of the formula $R_xR'_ySiO_{[4-(x+y)]/2}$. Thus the dielectric fluid can be composed of $RSiO_{3/2}$, $R_2SiO$, $R_3SiO_{1/2}$, RR'SiO, $RR'_2SiO_{1/2}$, or $R_2R'SiO_{1/2}$ units.

The R radical in the above siloxane units can be any nitroaryl radical containing from 6 to 18 carbon atoms. Nitroaryl radicals containing from 6 to 12 carbon atoms are preferred at this time with the nitrophenyl radical being the most preferred. Specific examples of this and other suitable R radicals are set forth infra.

It was quite unexpected to find that the presence of nitroaryl groups in siloxanes could be used as dielectric fluids and which give the outstanding properties which are illustrated in the examples.

The R' radical in the above siloxane units can be any alkyl, aryl, alkaryl or aralkyl radical containing from 1 to 18 carbon atoms. Thus R' can be, for example, a methyl, ethyl, propyl, isopropyl, butyl, isobutyl, t-butyl, amyl, hexyl, octyl, decyl, dodecyl, octadecyl, phenyl, xenyl, tolyl, benzyl or xylyl radical. It is preferred that R' be an alkyl radical containing from 1 to 6 carbon atoms with the methyl radical being the most preferred group.

The dielectric fluids can be composed entirely of the above siloxane units or combinations thereof with siloxane units of the formula $R''_zSiO_{(4-z)/2}$. In these latter units R" can be any alkyl, aryl, alkaryl, or aralkyl radical containing from 1 to 18 carbon atoms. The same illustrations and preferences with regard to R' set forth above are applicable to R". Illustrative of the type of units within the scope of the foregoing general formula are the $R''_3SiO_{1/2}$, $R''_2SiO$, $R''SiO_{3/2}$, and $SiO_{4/2}$ units.

The siloxanes useful as dielectric fluids in accordance with the instant invention can be prepared by techniques well known to those skilled in the art and hence their preparation will not be described here. It is noted, however, that one of the significant aspects of this invention is that by the control of the amount and kind of nitroarylsiloxane units in the dielectric fluid during preparation, one can tailor the final product to more nearly meet the specific needs of any intended use. This will be illustrated later herein.

The two most important electrical devices in which the dielectric fluids of this invention are useful are in transformers and capacitors. They are also very useful dielectric fluids in other electrical devices such as: electrical cables, rectifiers, electromagnets, switches, fuses, circuit breakers, and as coolants and insulators for dielectric devices such as transmitters, receivers, fly-back coils, sonar bouys, toys and military "black boxes." The method for employing dielectric fluids in these various applications (be they, for example, as a reservoir of liquid or as an impregnant) are well known to those skilled in the art. For best results, the viscosity of the dielectric fluids of this invention should be in the range of 5–500 cs. If the viscosity exceeds 500 cs. they are difficult to use as impregnants, and at less than 5 cs. their viscosity becomes a problem unless they are used in a closed system.

Now in order that those skilled in the art may better understand how the present invention can be practiced the following examples are given by way of illustration and not by way of limitation. All parts and percents referred to herein are by weight and all viscosities measured at 25°C. unless otherwise specified. All dissipation factors and all dielectric constants were measured according to ASTM Test D-924 and all volume resistivities were measured according to ASTM Test D-257 unless otherwise specified.

EXAMPLE 1

To a 3-necked flask equipped with a mechanical stirrer, thermometer, reflux condenser and addition funnel there was added a solution of two moles of sodium carbonate in 1,500 ml. of water. The funnel was charged with 1,000 ml. of toluene, 76g. (0.375 mole) of nitrophenylmethyldifluorosilane, 98g. (0.75 mole) of dimethyldichlorosilane and 28g. (0.25 mole) of trimethylchlorosilane. The funnel contents were added dropwise to the stirred flask contents over a period of 1½ hours. Heat was applied to the flask and the flask contents refluxed for 2½ hours, then the reaction mixture was stirred at room temperature overnight. The mixture was then allowed to separate, and the organic phase removed and washed with dilute HCl.

A small amount of tetramethylguanidine acetate (a silanol condensation catalyst) was added to the organic solution and then the solution heated at reflux for five hours under a Dean-Stark trap. Then the solvent was removed under vacuum. The residue was then dissolved in pentane and passed through a 12 inch × 2 inch column packed with alumina. The pentane was then removed, the residue filtered, and then stripped to 200°C. at about 1 mm. of mercury pressure. After again fltering through Super Cel, 90g. of a light yellow fluid product was obtained which had a viscosity of about 90 cs. Analysis by NMR indicated the structure to be (CH₃)₃SiO[(CH₃)SiO]₂-

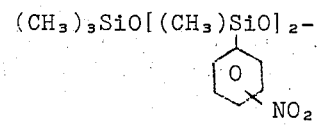

[(CH₃)₂SiO]₂Si(CH₃)₃.

Electrical properties of the fluid were as follows:

| Hertz | Dielectric Constant | Dissipation Factor |
|---|---|---|
| 10² | * | * |
| 10³ | 11.54 | 2.83 × 10⁻¹ |
| 10⁵ | 10.71 | 4.5 × 10⁻³ |

*Loss too high to measure.

EXAMPLE 2

A mixture of 98g. (0.76 mole) of dimethyldichlorosilane and 76g. (0.37 mole) of nitrophenylmethyldifluorosilane was cohydrolyzed in an aqueous potassium carbonate-toluene medium. After hydrolysis the toluene solution of the hydrolyzate was refluxed with hexamethyldisilazane and a silanol condensation catalyst. After reaction overnight the fluid was stripped to 205°C. at 0.005 mm. of mercury pressure to obtain a trimethylsiloxy endblocked fluid composed of about 67 mole percent (CH₃)₂SiO units and about 33 mole percent

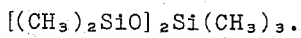

units, and having a viscosity of about 130 cs. This fluid was found to have a volume resistivity of 1.85 × 10⁸ ohm/cm. and the following electrical properties.

| Hertz | Dielectric Constant | Dissipation Factor |
|---|---|---|
| 10² | * | * |
| 10³ | 20.7 | 7.7 × 10⁻¹ |
| 10⁵ | 12.32 | 1.19 × 10⁻² |

*Loss too high to measure.

EXAMPLE 3

A copolymer composed of about 18 mole percent (CH₃)₃SiO₁/₂ units, about 54.5 mole percent (CH₃)₂SiO units and about 27.5 mole percent

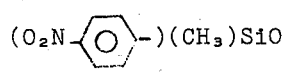

units was prepared by cohydrolysis and condensation of the appropriate silanes. The copolymer had a viscosity of about 500 cs. and the following electrical properties.

| Hertz | Dielectric Constant | Dissipation Factor |
|---|---|---|
| 10² | * | * |
| 10³ | * | * |
| 10⁵ | 12.72 | 2.16 × 10⁻² |

*Loss too high to measure.

EXAMPLE 4

A copolymer composed of about 17 mole percent (CH₃)₃SiO₁/₂ units and about 83 mole percent

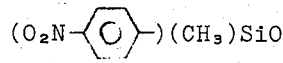

units was prepared by cohydrolysis and condensation of the appropriate silanes. The copolymer was found to have the following electrical properties.

| Hertz | Dielectric Constant | Dissipation Factor |
|---|---|---|
| 10² | 17.87 | 1.27 × 10⁻¹ |
| 10³ | 17.42 | 1.52 × 10⁻² |
| 10⁵ | 17.30 | 4.95 × 10⁻² |

EXAMPLE 5

A copolymer composed of about 75 mole percent (CH₃)₃SiO₁/₂ units and about 25 mole percent

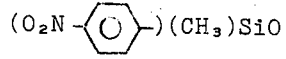

units was prepared by cohydrolysis and condensation of the appropriate silanes. The copolymer was found to have the following electrical properties.

| Hertz | Dielectric Constant | Dissipation Factor |
|---|---|---|
| 10² | 19.28 | 9.97 × 10⁻² |
| 10³ | 18.85 | 7.83 × 10⁻² |
| 10⁴ | 18.37 | 8.94 × 10⁻² |
| 10⁵ | 13.12 | 3.11 × 10⁻¹ |

EXAMPLE 6

When siloxane fluids containing the mole percents of the units set forth below are prepared they are useful as dielectric fluids in capacitors and transformers.

(A) 70% $(CH_3)_2SiO$

25% $(CH_3)_3SiO_{1/2}$

5% $O_2N-\langle C \rangle-SiO_{3/2}$ (B) 80% $(CH_3)_3SiO_{1/2}$

20% $O_2N-\langle C \rangle-SiO_{3/2}$ (C) 100% $(O_2N-\langle O \rangle-)(CH_3)SiO$ (D) 25% $(CH_3)(C_2H_5)SiO$ 60% $(CH_3)_2(C_{18}H_{37})SiO_{1/2}$ 15% $(O_2N-\langle C \rangle-)(C_2H_5)SiO$ (E) 30% $(CH_3)_2SiO$ 65% $(CH_3)_3SiO_{1/2}$ 5% $(O_2N-\langle C \rangle-\langle C \rangle-)(CH_3)_2SiO_{1/2}$ (F) 5% $CH_3SiO_{3/2}$ 85% $(CH_3)_3SiO_{1/2}$ 5% $(O_2N-\langle C \rangle-)_2SiO$ (G) 50% $(CH_3)_3SiO_{1/2}$ 25% $(O_2N-\langle C \rangle-)(C_6H_{13})SiO$ 24% $(CH_3)_2SiO$ 1% $SiO_2$ (H) 50% $(CH_3)_3SiO_{1/2}$ 25% $(O_2N-\langle O \rangle-)(CH_3)SiO$ 25% $(CH_3)(C_6H_5)SiO$ (I) 75% $(CH_3)_3SiO_{1/2}$ 15% $(O_2N-\langle O \rangle-)(C_6H_5)SiO$ 10% $(CH_3)(CH_3-\langle C \rangle-)SiO$ That which is claimed is:

1. In an electrical device containing a dielectric fluid, the improvement comprising employing as the dielectric fluid a siloxane which consists essentially of from 1 to 100 mole percent of $R_xR'_ySiO_{[4-(x+y)/2]}$ siloxane units wherein $x$ has an average value of from 1 to 3, $y$ has an average value of from 0 to 2, the sum of $x+y$ being from 1 to 3, R is a nitroaryl radical containing from 6 to 18 carbon atoms, and R' is an alkyl, aryl, alkaryl or aralkyl radical containing from 1 to 18 carbon atoms, and from 0 to 99 mole percent $R''_zSiO_{(4-z)/2}$ siloxane units wherein $z$ has an average value from 0 to 3 and R'' is an alkyl, aryl, alkaryl or aralkyl radical containing from 1 to 18 carbon atoms.

2. An electrical device as defined in claim 1 wherein the dielectric fluid has a viscosity in the range of 5 to 500 cs. at 25°C.

3. An electrical device as defined in claim 2 which is a transformer.

4. A transformer as defined in claim 3 wherein in the siloxane R contains from 6 to 12 carbon atoms, R' contains from 1 to 6 carbon atoms, and R'' contains from 1 to 6 carbon atoms.

5. A transformer as defined in claim 4 wherein R is a nitrophenyl radical, R' is a methyl radical, and R'' is a methyl radical.

6. A transformer as defined in claim 5 wherein the siloxane consists essentially of $(CH_3)_3SiO_{1/2}$ and $(O_2N-\langle C \rangle-)(CH_3)SiO$ units.

7. A transformer as defined in claim 5 wherein the siloxane consists essentially of $(CH_3)_3SiO_{1/2}$, $(O_2N-\langle C \rangle-)(CH_3)SiO$ and $(CH_3)_2SiO$ units.

8. A transformer as defined in claim 5 wherein the siloxane consists essentially of $(CH_3)_3SiO_{1/2}$, $(CH_3)_2SiO$ and $O_2N-\langle O \rangle-SiO_{3/2}$ units.

9. A transformer as defined in claim 5 wherein the siloxane consists essentially of $(CH_3)_3SiO_{1/2}$ and $O_2N-\langle C \rangle-SiO_{3/2}$ units.

10. An electrical device as defined in claim 2 which is a capacitor.

11. A capacitor as defined in claim 10 wherein in the siloxane R contains from 6 to 12 carbon atoms, R' contains from 1 to 6 carbon atoms, and R'' contains from 1 to 6 carbon atoms.

12. A capacitor as defined in claim 11 wherein R is a nitrophenyl radical, R' is a methyl radical, and R'' is a methyl radical.

13. A capacitor as defined in claim 12 wherein the siloxane consists essentially of $(CH_3)_3SiO_{1/2}$ and $(O_2N-\langle C \rangle-)(CH_3)SiO$ units.

14. A capacitor as defined in claim 12 wherein the siloxane consists essentially of $(CH_3)_3SiO_{1/2}$, $(O_2N-\langle C \rangle-)(CH_3)SiO$ and $(CH_3)_2SiO$ units.

15. A capacitor as defined in claim 12 wherein the siloxane consists essentially of $(CH_3)_3SiO_{1/2}$, $(CH_3)_2SiO$ and
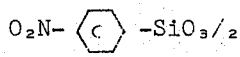
units.
16. A capacitor as defined in claim 12 wherein the siloxane consists essentially of $(CH_3)_3SiO_{1/2}$ and
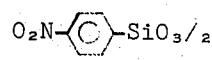
units.
* * * * *